(12) United States Patent
Hamza et al.

(10) Patent No.: US 12,208,358 B2
(45) Date of Patent: Jan. 28, 2025

(54) REPLENISHING LIQUID MATERIAL TO A MEMBRANE WITHIN A MULTI-MODULE SYSTEM

(71) Applicant: Imtex Membranes Corporation, Mississauga (CA)

(72) Inventors: Ali A. Hamza, Mississauga (CA); Kazem Shahidi, Mississauga (CA); Ian Pottinger, Dundas (CA)

(73) Assignee: Imtex Membranes Corporation

( * ) Notice: Subject to any disclaimer, the term of this patent is extended or adjusted under 35 U.S.C. 154(b) by 741 days.

(21) Appl. No.: 17/286,228

(22) PCT Filed: Oct. 18, 2019

(86) PCT No.: PCT/CA2019/051481
§ 371 (c)(1),
(2) Date: Apr. 16, 2021

(87) PCT Pub. No.: WO2020/077464
PCT Pub. Date: Apr. 23, 2020

(65) Prior Publication Data
US 2021/0354079 A1 Nov. 18, 2021

Related U.S. Application Data

(60) Provisional application No. 62/747,956, filed on Oct. 19, 2018.

(51) Int. Cl.
*B01D 53/22* (2006.01)
*B01D 65/02* (2006.01)
*B01D 71/08* (2006.01)

(52) U.S. Cl.
CPC ......... *B01D 53/228* (2013.01); *B01D 53/227* (2013.01); *B01D 65/02* (2013.01); *B01D 71/08* (2013.01); *B01D 2321/28* (2013.01)

(58) Field of Classification Search
CPC .... B01D 53/228; B01D 53/227; B01D 65/02; B01D 71/08; B01D 2321/28; B01D 61/38;
(Continued)

(56) References Cited

U.S. PATENT DOCUMENTS 3,844,735 A 10/1974 Steigelmann et al.
3,962,158 A 6/1976 Mima et al.
(Continued)

FOREIGN PATENT DOCUMENTS

CA 2426629 9/2012
CA 2838602 12/2012
(Continued)

OTHER PUBLICATIONS

Hamza et al. "Continuous Olefin/Paraffin Separation With Permylene™ Facilitated Transport Membranes From Imtex Membranes Corporation" Imtex (Year: 2015).*
(Continued)

*Primary Examiner* — Stephen Hobson
(74) *Attorney, Agent, or Firm* — Fish & Richardson P.C.

(57) ABSTRACT

There is provided a process for effecting separation of an operative material from a gaseous feed material via a membrane that includes a polymeric phase and a liquid phase, comprising: over a first time interval, within a first apparatus, separating a first fraction of the operative material in response to permeation of the first fraction of the operative material through the membrane, with effect that residual material, including unseparated operative material is discharged and, within a second apparatus, from the residual material, separating a second fraction of the operative material in response to permeation of the second fraction of the operative material through the membrane; and after the first time interval, disposing a liquid material relative to the
(Continued)

membrane of the first apparatus, such that a first fraction of the liquid material replenishes the liquid phase of the membrane of the first apparatus, and residual liquid material is collected by a redistributor and redistributed such that the residual liquid material becomes disposed relative the membrane of the second apparatus, such that a second fraction of the liquid material replenishes the liquid phase of the membrane of the second apparatus.

20 Claims, 3 Drawing Sheets

(58) Field of Classification Search
CPC .............. B01D 69/106; B01D 2256/24; B01D 2257/7022; B01D 2311/08; B01D 2317/022; B01D 53/226
See application file for complete search history.

(56) References Cited

U.S. PATENT DOCUMENTS

| | | | |
|---|---|---|---|
| 4,318,714 A | 3/1982 | Kimura et al. | |
| 4,808,313 A | 2/1989 | Michizuki et al. | |
| 5,670,051 A * | 9/1997 | Pinnau | B01D 53/228 585/818 |
| 9,782,724 B2 | 10/2017 | Feng et al. | |
| 2004/0000513 A1 | 1/2004 | Colling et al. | |
| 2004/0215045 A1 | 10/2004 | Herrera et al. | |
| 2006/0016750 A1 | 1/2006 | Merkel et al. | |
| 2008/0167512 A1 | 7/2008 | Sanders et al. | |
| 2016/0075620 A1 | 3/2016 | Su | |
| 2017/0354918 A1 | 12/2017 | Liu et al. | |
| 2018/0272274 A1 | 9/2018 | Kim et al. | |
| 2021/0354079 A1 | 11/2021 | Hamza et al. | |

FOREIGN PATENT DOCUMENTS

| | | |
|---|---|---|
| CN | 1060040 | 4/1992 |
| CN | 1713949 | 12/2005 |
| CN | 1845781 | 10/2006 |
| CN | 101053737 | 10/2007 |
| CN | 102123780 | 7/2011 |
| CN | 103331108 | 10/2013 |
| CN | 103796742 | 5/2014 |
| CN | 105683222 | 6/2016 |
| CN | 107614094 | 1/2018 |
| CN | 107921377 | 4/2018 |
| EP | 0458598 | 11/1991 |
| GB | 1431946 | 4/1976 |
| JP | S4948603 | 5/1974 |
| JP | H04227823 | 8/1992 |
| JP | H091130 | 1/1997 |
| JP | 2007105683 | 4/2007 |
| JP | 2007203280 | 8/2007 |
| JP | 2014-533193 | 12/2014 |
| JP | 2015-027654 | 2/2015 |
| JP | 2017-170447 | 9/2017 |
| JP | 2018-051494 | 4/2018 |
| WO | WO 2004/002609 | 1/2004 |
| WO | WO 2004/096415 | 11/2004 |
| WO | WO 2012/167362 | 12/2012 |

OTHER PUBLICATIONS

Azhin et al., "A review on olefin/paraffin separation using reversible chemical complexation technology," Journal of Industrial and Engineering Chemistry, Sep. 2008, 14(5):622-638.
Baker, "Future directions of membrane gas separation technology," Ind. Eng. Chem. Res, Feb. 2002, 1393-1411.
Bernardo et al., "Membrane gas separation: a review/state of the art," Industrial & Engineering Chemistry Research, May 2009, 48(10):4638-4663.
Bessarabov et al., "High-efficiency separation of an ethylene/ethane mixture by a large-scale liquid-membrane contactor containing flat-sheet nonporous polymeric gas-separation membranes and a selective flowing-liquid absorbent," Industrial & Engineering Chemistry Research. May 1995, 34(5):1769-1778.
Clemenson et al., "Metal nanocomposite films prepared in situ from PVA and silver nitrate. Study of the nanostructuration process and morphology as a function of the in situ routes," Journal of Polymer Science Part A: Polymer Chemistry. Mar. 2008, 46(6):2062-2071.
Hamza, "Continuous Olefin/Paraffin Separation with Permylene Facilitated Transport Membranes," Imtex Membranes Corp., Apr. 2015, 24 pages.
International Preliminary Report on Patentability in International Appln. No. PCT/CA2012/000554, mailed on Dec. 10, 2019, 6 pages.
International Preliminary Report on Patentability in International Appln. No. PCT/CA2019/051481, mailed on Apr. 14, 2021, 5 pages.
International Search Report and Written Opinion in International Appln. No. PCT/CA2012/000554, dated Sep. 13, 2012, 8 pages.
International Search Report and Written Opinion in International Appln. No. PCT/CA2019/051481, dated Dec. 13, 2019, 8 pages.
Merkel et al., "Silver salt facilitated transport membranes for olefin/paraffin separations: Carrier instability and a novel regeneration method," Journal of Membrane Science, Jul. 2013, (447):177-189.
Office Action in Australian Appln. No. 2012267170 dated Dec. 23, 2015, 5 pages.
Office Action in Canadian Appln. No. 2838602, dated Mar. 5, 2020, 7 pages.
Office Action in Chinese Appln. No. 20 1 2800385179 dated Mar. 3, 2015, 8 pages (with English translation).
Office Action in European Appln. No. 12797176.0, dated Jun. 27, 2017, 15 pages.
Office Action in Indian Appln. No. 10084/CHENP/2013, dated May 17, 2019, 7 pages (with English translation).
Office Action in Israeli Appln. No. 229809, dated Mar. 26, 2017, 7 pages (with English translation).
Office Action in Israeli Appln. No. 229809, dated Oct. 12, 2015, 7 pages (English translation only).
Office Action in Japanese Appln. No. 2014-513868 dated Apr. 5, 2016, 8 pages (with English translation).
Office Action in Japanese Appln. No. 2014-513868 dated Mar. 7, 2017, 8 pages (with English translation).
Office Action in Japanese Appln. No. 2017-134051, dated Aug. 7, 2018, 7 pages (with English translation).
Office Action in Russian Appln. No. 2013157902 dated May 11, 2016, 7 pages (with English translation).
Office Action in Russian Appln. No. 2014-513868 dated Oct. 4, 2016, 5 pages (with English translation).
Sluys et al., "Membrane assisted affinity separations: some techniques and applications," Membrane Processes in Separation and Purification, 1994, 395:406.
Summons to attend oral proceedings pursuant to Rule 115(1) EPC in European Appln No. 1297176.0, dated Feb. 25, 2021, 9 pages.
Supplementary European Search Report in European Appln No. 12797176.0, dated Oct. 21, 2014, 9 pages.
Teramoto et al, "Separation of ethylene from ethane by a flowing liquid membrane using silver nitrate as a carrier," Journal of Membrane Science, Elsevier, Jul. 1989, 45(1-2):115-136.
Teramoto et al., "Separation of ethylene from ethane by a flowing liquid membrane using silver nitrate as a carrier," Journal of Membrane Science, Jul. 1989, 45(1-2):115-136.
Teramoto et al., "Separation of ethylene from ethane by supported liquid membranes containing silver nitrate as a carrier," Journal of Chemical Engineering of Japan, Oct. 1986, 19(5):419-424.
Office Action in Chinese Appln. No. 201980069025.8, dated Nov. 14, 2022, 19 pages (with English translation).
Office Action in Chinese Appln. No. 201980069024.3, dated Dec. 13, 2022, 23 pages (with English translation).
Office Action in Indian Appln. No. 202147021721, dated Nov. 2, 2022, 5 pages (with English translation).
Search Report in Indian Appln. No. 202147021728, mailed on Nov. 18, 2022, 7 pages.

(56) References Cited

OTHER PUBLICATIONS

Extended European Search Report in European Appln No. 19874508.5, dated Jun. 14, 2022, 10 pages.
Faiz et al., "Olefin/paraffin separation using membrane based facilitated transport/chemical absorption techniques," Chemical Engineering Science, May 2012, 73:261-284.
Office Action in Japanese Appln. No. 2021-521419, mailed Nov. 28, 2023, 21 pages (with English Translation).
Office Action in United Arab Emirates Appln. No. P6000608/2021, mailed Dec. 8, 2023, 9 pages.

\* cited by examiner

REPLENISHING LIQUID MATERIAL TO A MEMBRANE WITHIN A MULTI-MODULE SYSTEM

CROSS-REFERENCE TO RELATED APPLICATIONS

This application is a National Stage application under 35 U.S.C. § 371 of International Application No. PCT/CA2019/051481, having an International Filing Date of Oct. 18, 2019, which claims priority to U.S. Provisional Application No. 62/747,956, filed on Oct. 19, 2018. The disclosures of the prior applications are considered part of the disclosure of this application, and are incorporated in their entirety into this application.

FIELD

This relates to improving the performance of permeation processes.

BACKGROUND

Membrane-based separation has proved to be an efficient technology for gaseous separations. Some of the mechanisms for facilitating selective permeation of material through the membrane involve bonding with a carrier that is dissolved within a solution disposed within the membrane polymer matrix. This carrier forms a reversible complex with at least one component of a given mixture and thus enables enhanced transport across the membrane. During operation, the liquid media within the membrane polymer matrix becomes depleted, which affects membrane separation performance.

SUMMARY

In one aspect, there is provided a process for effecting fractionation of gaseous feed material via a membrane that includes a polymeric phase and a liquid phase, comprising: over a first time interval, within a first apparatus, fractionating the gaseous feed material via a first membrane that includes a polymeric phase and a liquid phase, with effect that retentate is discharged and, within a second apparatus, receiving the discharged retentate and fractionating the retentate via a second membrane that includes a polymeric phase and a liquid phase; and after the first time interval, and over a second time interval, disposing a liquid material relative to the membrane of the first apparatus, such that a first fraction of the liquid material replenishes the liquid phase of the first membrane of the first apparatus, and residual liquid material is collected by a redistributor and redistributed such that the residual liquid material becomes disposed relative the second membrane of the second apparatus, such that a second fraction of the liquid material replenishes the liquid phase of the second membrane of the second apparatus.

In another aspect, there is provided a process for effecting separation of an operative material from a gaseous feed material via a membrane that includes a polymeric phase and a liquid phase, comprising:

over a first time interval, within a first apparatus, separating a first fraction of the operative material in response to permeation of the first fraction of the operative material through the membrane, with effect that residual material, including unseparated operative material is discharged and, within a second apparatus, from the residual material, separating a second fraction of the operative material in response to permeation of the second fraction of the operative material through the membrane; and after the first time interval, disposing a liquid material relative to the membrane of the first apparatus, such that a first fraction of the liquid material replenishes the liquid phase of the membrane of the first apparatus, and residual liquid material is collected by a redistributor and redistributed such that the residual liquid material becomes disposed relative the membrane of the second apparatus, such that a second fraction of the liquid material replenishes the liquid phase of the membrane of the second apparatus.

BRIEF DESCRIPTION OF DRAWINGS

The preferred embodiments will now be described with the following accompanying drawings.

DETAILED DESCRIPTION

Unless stated otherwise, such as in the examples, all amounts and numbers used in this specification are intended to be interpreted as modified by the term ' about'. Likewise, all compounds or elements identified in this specification, unless stated otherwise, are intended to be non-limiting and representative of other compounds or elements generally considered by those skilled in the art as being within the same family of compounds or elements.

The term "associated" and grammatical variations thereof include any type of interaction, including chemical bonds (for example, covalent, ionic and hydrogen bonds) and/or Van der Waals forces, and/or polar and non-polar interactions through other physical constraints provided by molecular structure, and interactions through physical mixing.

Figure 1:
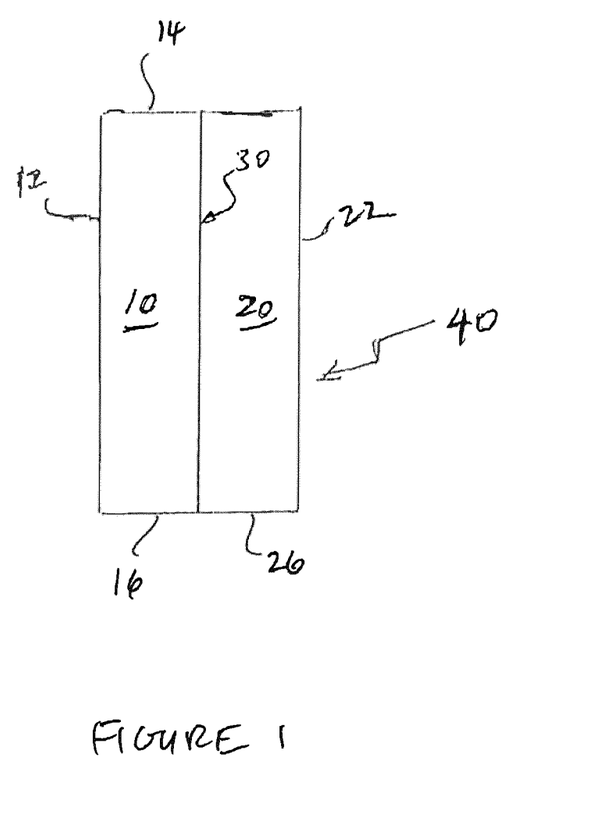
FIG. 1 is a schematic illustration of an embodiment of an apparatus in which is practised an embodiment of the process.

Referring to FIG. 1, there is provided a membrane 30 for effecting separation of at least a fraction of an operative material from a gaseous feed material. The gaseous feed material is being supplied to a feed material receiving space 10 that is disposed in mass transfer communication with a permeate receiving space 20 through a membrane 30.

In some embodiments, for example, the operative material includes at least one operative compound. In some of these embodiments, for example, the operative material-derived material includes at least one operative material-derived compound. For each one of the at least one operative material-derived compound, at least a fragment of the operative material-derived compound is derived from the operative material. Each one of the at least one operative material-derived compound includes at least a fragment of one or more of the operative compounds.

In some embodiments, for example, a suitable operative compound is an olefin, and suitable olefins include ethylene, propylene, 1-butene, and 2-butene.

In some embodiments, for example, the operative material is defined by at least one operative compound, and each one of the at least one operative compound is an olefin. In some embodiments, for example, the operative material is defined by at least one operative compound, and the at least one operative compound is a single operative compound, and the single operative compound is an olefin.

In some embodiments, for example, a suitable olefin is an olefin having a total number of carbon atoms of between two (2) and eight (8).

In some embodiments, for example, one or more of the olefins is an alpha olefin.

The membrane 30 includes a polymeric phase and a liquid phase. In some embodiments, for example, the polymeric phase includes a polymeric matrix, and the liquid phase is dispersed throughout the polymeric matrix.

In some embodiments, for example, the polymeric material of the polymeric phase includes at least one polymer compound. In some embodiments, for example, each one of the at least one polymer compound is hydrophilic. In some embodiments, for example, each one of the at least one polymer compound has a number average molecular weight of between 20,000 and 1,000,000.

In some embodiments, for example, the liquid phase is aqueous.

In some embodiments, for example, the liquid phase is associated with polymeric material of the polymeric phase.

In some embodiments, for example, the association is effective for fractionating a fluid mixture that is passing through the membrane. In some embodiments, for example, the fractionation is based on differences in permeability through the membrane, as between compounds within a fluid mixture. In some embodiments, for example, the fractionation, of a fluid mixture including two compounds, is with effect that the separation factor for the separation of the two compounds, based on the faster permeating compound, is at least two (2). In some embodiments, for example, the fractionation, of a fluid mixture including an olefin and a paraffin, is with effect that the separation factor for the separation of the olefin from the paraffin, based on the olefin, is at least two (2).

In some embodiments, for example, the membrane is a supported liquid membrane, and the liquid phase is disposed on the surface and/or within pores defined within the polymeric phase of the supported liquid membrane. In some of these embodiments, for example, the polymeric phase and the liquid phase are co-operatively configured such that at least capillary forces are acting upon the liquid phase which is disposed within the pores defined within the polymeric phase.

In some embodiments, for example, the liquid phase is defined by a continuous liquid phase domain, and the continuous liquid phase domain is encapsulated within the polymeric phase.

In some embodiments, for example, the association is with effect that a gel is defined. In some embodiments, for example, the gel includes a hydrogel.

In some embodiments, for example, the association is with effect that the polymer phase is swollen.

In some embodiments, for example, the association includes chemical bonding (for example, by way of covalent bonding, ionic bonding, or hydrogen bonding), Van der Waals forces, polar interactions, or non-polar interactions, or any combination thereof.

In some embodiments, for example, the polymeric material includes polysaccharide material. In this respect, in some embodiments, for example, the polysaccharide material includes one or more polysaccharides. Suitable polysaccharides include natural polysaccharides such as alginic acid, pectic acid, chondroitin, hyaluronic acid and xanthan gum; cellulose, chitin, pullulan, derivatives of natural polysaccharides such as C1-6 esters, esters, ether and alkylcarboxy derivatives thereof, and phosphates of these natural polysaccharide such as partially methylesterified alginic acid, carbomethoxylated alginic acid, phosphorylated alginic acid and aminated alginic acid, salts of anionic cellulose derivatives such as carboxymethyl cellulose, cellulose sulfate, cellulose phosphate, sulfoethyl cellulose and phosphonoethyl cellulose, and semi-synthetic polysaccharides such as guar gum phosphate and chitin phosphate. Specific examples of membranes of polysaccharides include those composed of salts of chitosan and its derivatives (including salts of chitosan) such as N-acetylated chitosan, chitosan phosphate and carbomethoxylated chitosan. Of these, membranes composed of alginic acid, and salts and derivatives thereof, chitosan and salts and derivatives thereof cellulose and derivatives thereof are preferred in view of their film-formability, mechanical strength and film functions, as well as gel formation and swellability (the tendency to be swollen when exposed to water).

In those embodiments where the membrane includes a hydrogel, in some of these embodiments, for example, the hydrogel includes one or more polysaccharides, and also includes one or more other polymeric compounds. In this respect, in some embodiments, for example, the membranes is comprised of blends of a major amount (e.g. at least 60 weight %, based on the total weight of the membrane) of one or more polysaccharides and lesser amounts (e.g. up to 40 weight %, based on the total weight of the membrane) of one or more other compatible polymeric compounds, such as, for example, polyvinyl alcohol (PVA), or neutral polysaccharides such as starch and pullulan. In some embodiments, for example, the membrane is comprised of grafted ionized polysaccharides obtained by grafting a hydrophilic vinyl monomer such as acrylic acid.

In some embodiments, for example, the membrane is a facilitated transport membrane. In this respect, in some embodiments, for example, the membrane includes a carrier agent for facilitating transport of material through the membrane.

In those embodiments where the membrane is a facilitated transport membrane, in some of these embodiments, for example, the membrane includes a gel.

In those embodiments where the membrane is a facilitated transport membrane, in some of these embodiments, for example, the carrier agent is dissolved within the liquid material of the liquid phase. In some embodiments, for example, the carrier agent includes at least one metal cation. In some embodiments, for example, the carrier agent includes silver ion. In some embodiments, for example, the carrier agent includes cuprous ion. In some embodiments, for example, the carrier agent includes silver ion and, in this respect, the liquid material includes dissolved silver nitrate, and the carrier agent includes the silver ion of the silver nitrate. In some of these embodiments, for example, the silver nitrate is dissolved in the liquid material such that there is provided an aqueous solution, which is part of the membrane gel, and the aqueous solution includes dissolved silver nitrate. In some embodiments, for example, the carrier agent is complexed with, or chelated to, the polymeric material of the polymeric phase.

In some embodiments, for example, the membrane is supported on a substrate such that a composite membrane is obtained.

Suitable substrates include films, non-woven supports, flat sheets, in plate and frame configurations, in spiral wound configurations, and tubular substrates or hollow fibre substrates.

Suitable substrates also include ultrafiltration membranes and nanofiltration membranes, with pore size of between 1 and 500 nanometres, such as, for example, between 5 and 300 nanometres.

Suitable substrate materials include polyesters, polysulphones, polyethersulphones, polyimides, polyamides, polycarbonates, polyacrylonitriles, cellulose acetate, and any combination thereof. Support material can also be fine pore ceramic, glass and/or metal.

With respect to composite membranes, in some embodiments, for example, the membrane has a thickness from 0.01 to 20 microns, such as from 0.5 to ten (10) microns, or such as from one (1) to five (5) microns, and the substrate material has a thickness from 30 to 200 microns, such as from 50 to 150 microns, or such as from 80 to 110 microns.

With respect to composite membranes, in some embodiments, for example, the membrane is applied to the substrate. In some of these embodiments, for example, the application is by way of coating, casting, or laminating.

In some of embodiments, for example, the membrane layer is continuous. In some embodiments, for example, the membrane is discontinuous.

With respect to composite membranes, in some embodiments, for example, the membrane layer extends into the pores of the substrate.

With respect to composite membranes, the composite membrane can be embodied in any one of several configurations, including flat sheet, plate and frame, spiral wound, tubular, or hollow fibre.

An exemplary method of manufacturing the membrane includes casting a solution of polymeric material (such as one or more polysaccharides) as a film. In some embodiments, for example, the solution includes less than five (5) weight percent polymeric material, based on the total weight of solution. In some embodiments, for example, the solution includes less than two (2) weight percent polymeric material, based on the total weight of solution. In some embodiments, for example, the solution is an acidic aqueous solution. In some embodiments, the acid is an organic acid such as an organic acid having a total number of carbons of between one (1) and four (4). In some embodiments, for example, the acid includes acetic acid. In some embodiments, for example, the resulting solution may be cast as a film on a flat plate to effect production of a membrane intermediate. Suitable casting surfaces include glass or Teflon™ or the like (e.g. a smooth substrate to which the polymer film will have a low adhesion). The solution is then dried to form a film. In other embodiments, for example, the resulting solution may be cast as a film on a substrate material to effect production of a membrane intermediate supported on a substrate material.

In those embodiments where the polymeric material includes polysaccharide material, in some of these embodiments, for example, the polymeric material includes chitosan. The following describes an exemplary method of manufacturing a membrane where the polymeric material of the polymeric phase is chitosan.

Chitosan is a generic term for deacetylation products of chitin obtained by treatment with concentrated alkalis. Chitin is the principal constituent of shells of crustaceans such as lobsters and crabs. In some embodiments, for example, chitosan is obtained by heating chitin, in the presence of an alkaline solution (such as, for example, an aqueous solution of sodium hydroxide) having an alkali concentration of 30 to 50% by weight, to a temperature of at least 60.degrees Celsius, with effect chitin is deacetylated. Chemically, chitosan is a linear polysaccharide composed of randomly distributed β(1-4)-linked D-glucosamine (de-acetylated unit) and N-acetyl-D-glucosamine (acetylated unit). Chitosan readily dissolves in a dilute aqueous solution of an acid, such as acetic acid and hydrochloric acid, with the formation of a salt, but when contacted again with an aqueous alkaline solution, is again coagulated and precipitated. In some embodiments, for example, chitosan has a deacetylation degree of at least 50%, and in some of these embodiments, for example, chitosan has a deaccetylation degree of at least 75%.

An intermediate chitosan membrane can be obtained by dissolving chitosan in dilute aqueous acid solution, casting the solution as a film onto a flat plate to form a homogeneous chitosan fraction, or onto a substrate material to form a composite membrane. The cast film may then be contacted with an aqueous alkaline solution to neutralize the acidity and render it less soluble or substantially insoluble in water, or air-dried and then contacted with the aqueous alkaline solution.

To prepare the chitosan-type polysaccharide membrane, the amino groups of the intermediate composite membrane are at least partly neutralized with one or more acids to form an ammonium salt. Examples of suitable acids that can be utilized for neutralization include inorganic acids such as hydrochloric acid, hydrobromic acid, sulfuric acid and phosphoric acid; and organic acids such as acetic acid, methanesulfonic acid, formic acid, propionic acid, oxalic acid, malonic acid, succinic acid, fumaric acid, maleic acid, glutaric acid, phthalic acid, isophthalic acid, terephthaic acid, trimesic acid, trimellitic acid, citric acid, aconitic acid, sulfobenzoic acid, pyromellitic acid and ethylenediaminetetraacetic acid.

Protonation of the intermediate chitosan-type polysaccharide membrane using these acids can be effected, for example, by a method which comprises immersing the intermediate chitosan-type polysaccharide membrane in a solution containing the acid to ionize the amino groups in the membrane; or by a method which comprises subjecting the chitosan-type polysaccharide membrane to pervaporation with a mixed liquid containing the acid to convert the amino groups in the chitosan-type polysaccharide membrane successively to ammonium ions.

In some embodiments, for example, the membrane intermediate has a dry thickness from 10 nanometres (0.01 microns) to 20 microns, such as from 0.5 to ten (10) microns, or such as from one (1) to five (5) microns. In some embodiments, for example, the substrate material has a thickness from 30 to 200 microns, such as from 50 to 150 microns, or such as from 80 to 110 microns.

The membrane intermediate is then contacted with a salt of a metal cation (such as silver ion or cuprous ion). In some embodiments, for example, the contacting includes immersing the membrane intermediate in an aqueous solution including a salt of a metal cation (such as one (1) to eight (8) M aqueous silver nitrate solution). The contacting effects disposition of metal cations into (for example, through chelation and/or complexing) and throughout the matrix of the membrane, and within its pores, and effects formation of the gel.

The process includes supplying the gaseous feed material to the feed material receiving space 10 for effecting fractionating by the membrane 30. In some embodiments, for example, the gaseous feed material has a relative humidity of between 0 and 100%. In some embodiments, for example, the gaseous feed material has a relative humidity of between 70 and 99%. In some embodiments, for example, the gaseous feed material has a relative humidity of between 95 and 99%.

The supplying of the gaseous feed material to the feed material receiving space 10 is with effect that transfer (e.g. permeation) of at least a fraction of the gaseous feed material-disposed operative material (hereinafter, such fraction being referred to as a "separation fraction") from the feed material receiving space 10, through the membrane 30, and into the permeate receiving space 20. The transfer (e.g. permeation) of at least a separation fraction of the gaseous feed material-disposed operative material to the permeate receiving space effects production of the gaseous permeate-disposed operative material within the permeate receiving space 20. The transfer (e.g. permeation) is effected in response to a differential in chemical potential of the operative material, as between the feed material receiving space and the permeate receiving space. In this respect, while the transfer (e.g. permeation) is being effected, the chemical potential of the operative material disposed in the feed material receiving space 10 (i.e. the feed material receiving space-disposed operative material) is greater than the chemical potential of the operative material disposed within the permeate receiving space 20 (i.e. the permeate receiving space-disposed operative material). In some embodiments, for example, the chemical potential is defined by partial pressure, such that the transfer (e.g. permeation) is effected in response to a differential in partial pressure of the operative material, as between the feed material receiving space 10 and the permeate receiving space 20. In this respect, while the transfer (e.g. permeation) is being effected, the partial pressure of the operative material disposed in the feed material receiving space 10 (i.e. the feed material receiving space-disposed operative material) is greater than the partial pressure of the operative material disposed within the permeate receiving space 20 (i.e. the permeate receiving space-disposed operative material).

Figure 2:
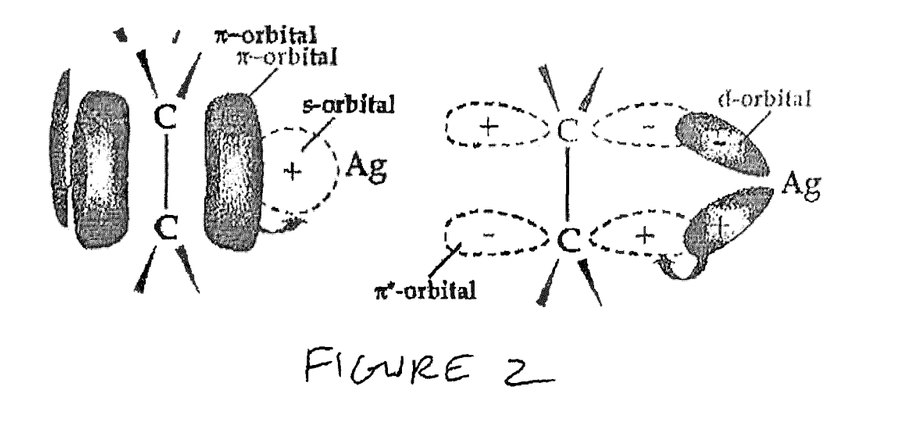
FIG. 2 is illustrative of the association effected in response to contacting of an olefin (ethylene) and a carrier agent (silver ion)

The transfer (e.g. permeation) of the at least a separation fraction of the gaseous feed material-disposed operative material to the permeate receiving space 20 includes transporting of the at least a separation fraction through the membrane 30. During the transporting, and where the liquid phase of the membrane includes a carrier agent, the at least a separation fraction becomes temporarily associated with the carrier agent. It is believed that, in some embodiments, for example, in response to the contacting of, or interaction between, the at least a separation fraction and the carrier agent, a reversible chemical reaction is effected between the at least a separation fraction and the carrier agent. In those embodiments where the operative material includes an olefin and the carrier agent includes a silver ion dissolved in an aqueous solution of the liquid phase of the membrane, a reactive process is effected such that the olefin becomes chemically modified by bonding with the carrier agent (e.g. silver ion) through it-complexation. In this respect, in some embodiments, for example, the association is one of chemical bonding through 7C-complexation. FIG. 2 is illustrative of the association effected in response to contacting of an olefin (ethylene) and the carrier agent (silver ion). In some of these embodiments, for example, the carrier agent is chelated to, or complexed with, the polymeric material of the polymer phase.

It is believed that, in some embodiments, the transporting of the at least a separation fraction across the membrane 30 and towards the permeate receiving space 20 includes that effected by the transporting of an operative material-derived material across the membrane 30 and towards the permeate receiving space 20. The operative material-derived material is produced by contacting of the at least a separation fraction with the carrier agent. In this respect, in some embodiments, the transporting of the operative material-derived material across the membrane 30 and towards the permeate receiving space 20 is facilitated by mobility of the operative material-derived material within the membrane 30. In some of these embodiments, for example, the transporting of the operative material-derived material across the membrane 30 and towards the permeate receiving space 20 is facilitated by mobility of the operative material-derived material within the liquid phase of the membrane.

It is also believed that, in some embodiments, the transporting of the at least a separation fraction across the membrane 30 and towards the permeate receiving space 20 includes that effected by "hopping" of the at least a separation fraction from association with one carrier agent to the next until reaching the permeate receiving space 20.

It is also believed that, in some embodiments, the transporting of the at least a separation fraction across the membrane 30 and towards the permeate receiving space 20 includes that effected by a combination of both of the above-described transport mechanisms.

Because of the difference in chemical potential of the operative material, as between the feed material receiving space and the permeate receiving space, the concentration of the at least a separation fraction within that portion of the membrane proximate to the feed material receiving space 10 is greater than the concentration of the at least a separation fraction within that portion of the membrane proximate to the permeate receiving space 20, and thereby effects a driving force for the transport.

In some embodiments, for example, while the transfer (e.g. permeation) of the at least a separation fraction to the permeate receiving space 20 is being effected, a gaseous operative material-depleted residue is discharged from the feed material receiving space. The molar concentration of the operative material within the gaseous feed material, which is being supplied, is greater than the molar concentration of the operative material within the gaseous operative material-depleted residue, which is being discharged.

In some embodiments, for example, while the transfer (e.g. permeation) of the at least a separation fraction to the permeate receiving space 20 is being effected, a gaseous operative material-depleted residue is discharged from the feed material receiving space, and a gaseous permeate product, including the gaseous permeate-disposed operative material, is discharged from the permeate receiving space. The molar concentration of the operative material within the gaseous feed material, which is being supplied, is greater than the molar concentration of the operative material within the gaseous operative material-depleted residue, which is being discharged, and the molar concentration of the operative material within the gaseous permeate product, which is being discharged, is greater than the molar concentration of the operative material within the gaseous feed material, which is being supplied. In this respect, the gaseous feed material is fractionated based on the relative permeabilities of its constituent materials.

In some embodiments, for example, the transferring of the at least a separation fraction is effected while the temperature within each one of the gaseous feed receiving space and the permeate receiving space is between 5 degrees Celsius and 80 degrees Celsius. In some embodiments, for example, the transferring of the separation fraction is effected while the temperature within each one of the gaseous feed receiving space and the permeate receiving space is between 10 degrees Celsius and 75 degrees Celsius. In some embodiments, for example, the transferring of the separation fraction is effected while the temperature within each one of the gaseous feed receiving space and the permeate receiving space is between 15 degrees Celsius and 70 degrees Celsius.

In some embodiments, for example, the gaseous feed material further includes slower permeating material. The slower permeating material includes at least one slower permeating compound. A slower-permeating compound is a compound that is characterized by a lower permeability through the membrane 30 than that of each one of the at least one operative compound. Such lower permeability may be derived from its relatively lower diffusivity in the membrane, its relatively lower solubility in the membrane, or both.

In some embodiments, for example, the slower permeating compound has substantially no permeability through the membrane 30.

In some embodiments, for example, the transfer (e.g. permeation) of the at least a separation fraction of the gaseous feed material-disposed operative material is effected while at least one slower-permeating compound is transferring (or permeating) from the feed material receiving space 10, through the membrane 30 and into the permeate receiving space 20. For each one of the at least one operative compound of the at least a separation fraction of the gaseous feed material-disposed operative material there is provided an operative compound-associated operative ratio defined by the ratio of the molar rate of permeation of the operative compound to the mole fraction of the operative compound within the feed material receiving space, such that a plurality of operative compound-associated operative ratios are defined, and at least one of the plurality of operative compound-associated operative ratios is a minimum operative compound-associated operative ratio. For each one of the at least one transferring (or permeating) slower permeating compound, the ratio of the molar rate of permeation of the slower permeating compound to the mole fraction of the slower permeating compound within the feed material receiving space is less than the minimum operative compound-associated operative ratio, such that, for each one of the at least one operative compound, the molar concentration of the operative compound within a gaseous permeate, that is transferred (or permeated) from the gaseous feed receiving space, through the membrane, and into the permeate receiving space, is greater than the molar concentration of the operative compound within the gaseous feed material. In some embodiments, for example, while the transferring is being effected, the gaseous permeate is discharged from the permeate receiving space as the gaseous permeate product. In this respect, the gaseous feed material is fractionated based on differences in permeabilities between its compounds.

In some embodiments, for example, each one of the at least one operative compound is an olefin, and each one of the at least one slower permeating compound is a paraffin.

In some embodiments, for example, the at least one operative compound is a single operative compound and the single operative compound is an olefin, and the at least one slower permeating compound is a single slower permeating compound and the single slower permeating compound is a paraffin.

In some embodiments, for example, a suitable paraffin is a paraffin having a total number of carbon atoms of between one (1) and ten (10).

In some embodiments, for example, the process is effected within an apparatus 40, and the feed material receiving space 10 and the permeate receiving space 20 are defined by respective compartments 12, 22 within the apparatus 40.

The feed material receiving space-defining compartment 12 includes a receiving communicator 14 and a discharge communicator 16. The receiving communicator 14 is disposed for receiving gaseous feed material for supply to the feed material receiving space 10 for disposing the gaseous feed material in mass transfer communication with the membrane 30, and, in some embodiments, for receiving replenishment material for supply to the feed material receiving space 10 for effecting disposition of the replenishment material in mass transfer communication with the membrane 30 for effecting replenishing of the liquid material of the liquid phase of the membrane 30 that has become depleted during the process. The discharge communicator 16 is disposed for discharging residual material including the gaseous operative material-depleted residue. The permeate receiving space-defining compartment 22 includes a discharge communicator 26. The discharge communicator 26 is disposed for discharging the gaseous permeate product.

Figure 3:
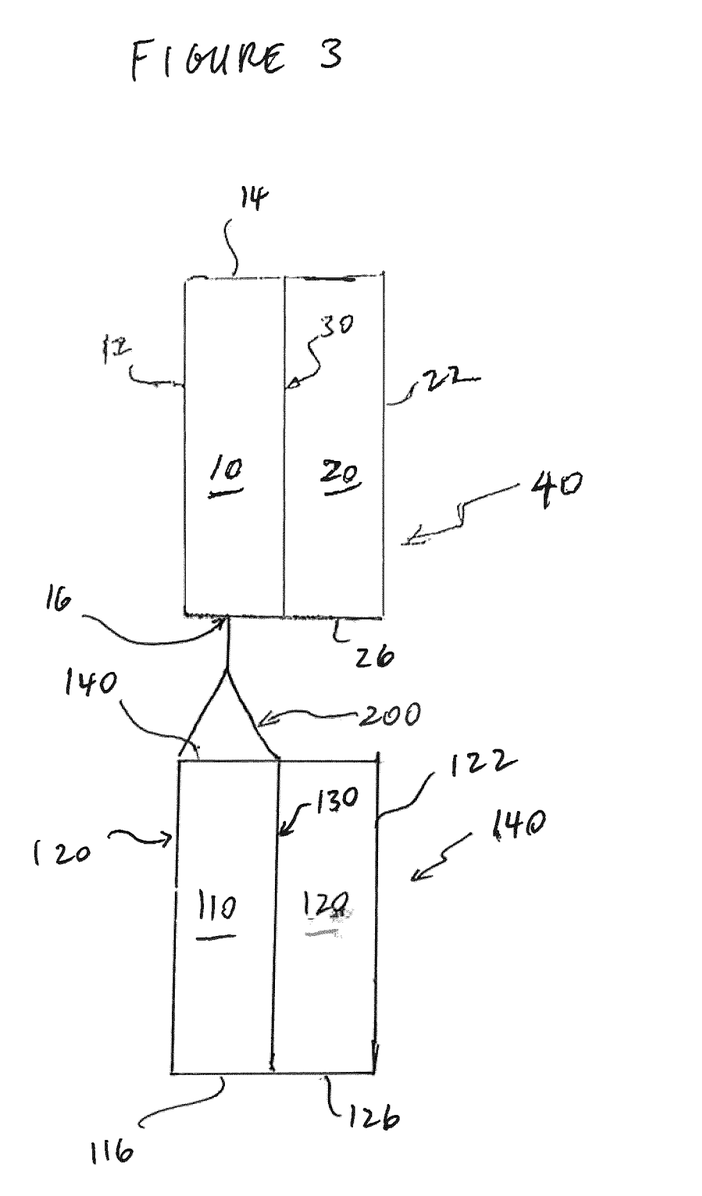
FIG. 3 is a schematic illustration of an embodiment of a system in which is practised an embodiment of the process.

Referring to FIG. 3, in some embodiments, for example, the apparatus 40 is a first apparatus 40, and a system 5 is provided including the first apparatus 40 and a second apparatus 140. The second apparatus 140 includes compartments 112, 122 which define, respectively, a feed material receiving space 110 and a permeate receiving space 120. The feed material receiving space 110 is disposed in mass transfer communication with a permeate receiving space 120 through a membrane 130. The membrane 130 is similar to the membrane 30, and is defined by any one of the embodiments of the membrane 30 that are described herein. The feed material receiving space-defining compartment 112 includes a receiving communicator 114 and a discharge communicator 116. The permeate receiving space-defining compartment 122 includes a discharge communicator 126. The discharge communicator 126 is disposed for discharging a gaseous permeate product.

The feed material receiving space 110 of the second apparatus 140 is disposed for receiving the residual material from the feed material receiving space 10 of the first apparatus for disposing the residual material in mass transfer communication with the membrane 130. While disposed in mass transfer communication with the membrane 130. transfer (e.g. permeation) of at least a fraction of the gaseous feed material-disposed operative material (hereinafter, such fraction being referred to as a "separation fraction") of the residual material, from the feed material receiving space 110, through the membrane 130, and into the permeate receiving space 120, is effected. This transfer (e.g. permeation) is effected in a similar way as that described above with respect to the transfer (e.g. permeation) in the first apparatus 10. The transfer (e.g. permeation) of at least a separation fraction of the gaseous feed material-disposed operative material to the permeate receiving space 120 effects production of the gaseous permeate-disposed operative material within the permeate receiving space 120, which is then discharged via the discharge communicator 126. In this way, gaseous feed material-disposed operative material, that is not recovered as permeate within the first apparatus, may be recovered as permeate within the second apparatus 140.

The process further includes effecting contacting of the membrane 30 and 130 with a replenishment material. The replenishment material includes liquid material.

At least some of the liquid material, of the liquid phase of the membrane 30, is depleted during the contacting of the gaseous feed material with the membrane (for example, while the gaseous feed material is being supplied to the feed material receiving space 10 (110)), wherein the contacting is with effect that transferring (permeation) of the at least a separation fraction is effected. The contacting of the membrane with the replenishment material effects at least partial replenishment of the liquid material within the liquid phase of the membrane.

Replenishment is desirable as liquid material is depleted from the liquid phase due to mass transfer from the membranes 30 (130), such as, for example, mass transfer into both of the feed material receiving space 10 (110) and the permeate receiving space 20 (120). Liquid material may evaporate and be transported into the feed material receiving space 10 (110) in response to a concentration gradient. Liquid material may also evaporate and become disposed in the at least a separation fraction that is permeating through the membrane 30 (130). The at least a separation fraction expands through the membrane as it is being transported from the feed material receiving space 10 (110) to the permeate receiving space 20 (120). As the at least a separation fraction is expanding, the liquid from the liquid phase evaporates and becomes swept by the permeating at least a separation fraction.

In some embodiments, for example, the liquid material of the replenishment material is water. In some embodiments, for example, the liquid material includes water.

In some embodiments, for example, the replenishment material includes between 10 and 90 weight % water, based on the total weight of the replenishment material. In some embodiments, for example, the replenishment material includes between 25 and 75 weight % water, based on the total weight of the replenishment material. In some embodiments, for example, the replenishment material includes between 30 and 50 weight % water, based on the total weight of the replenishment material.

In some embodiments, for example, the liquid material of the replenishment material may also include other additives, such as co-solvents and hygroscopic material.

In some embodiments, for example, the replenishment material includes a replenishment material-disposed carrier agent that is dissolved within a replenishment material-disposed liquid material. The replenishment material-disposed liquid material of the replenishment material defines liquid material of the replenishment material. The replenishment material-disposed carrier agent that is dissolved within the replenishment material-disposed liquid material defines dissolved carrier agent of the replenishment material. In those embodiments where the liquid material is water, in some of these embodiments, for example, the carrier agent is dissolved in water such that there is provided an aqueous solution including dissolved carrier agent.

By including carrier agent within the replenishment material-disposed liquid material, stripping of the carrier agent from the membrane, during the contacting of the membrane with the replenishment material, is mitigated. In this respect, in some embodiments, for example, where the replenishment material does not contain carrier agent, due to a concentration gradient, carrier agent, that is associated within the membrane 30 (130), may transport from the membrane 30 (130) to the replenishment material that is being contacted with the membrane 30 (130).

In some embodiments, for example, the carrier agent is silver ion, and the replenishment material includes an aqueous solution including a molar concentration of silver ion of at least 1.0. In some embodiments, for example, the replenishment material includes an aqueous solution including a molar concentration of silver ion of between 2.0 and 10.0. In some embodiments, for example, the replenishment material includes an aqueous solution including a molar concentration of silver ion of between 5.0 and 8.0. In some of these embodiments, for example, the membrane includes chitosan.

The rate and extent of liquid material depletion depends on operating conditions, such as operating temperatures and pressures, rate of material flow through the feed material receiving space, and rate of discharge of permeate product from the permeate receiving space, and also on the water content within each one of the feed material receiving space and the permeate receiving space. Maintaining a minimum concentration of liquid material within the membrane assists in effecting continuous separation and permeation as a desirable mobility of the operative material-derived material is facilitated while a desirable structural integrity of the membrane is maintained. Complete depletion of liquid material may lead to uneven stresses, fractures or pinholes that would compromise performance. By including carrier agent within the replenishment material-disposed liquid material, stripping of the carrier agent from the membrane, during the contacting of the membrane with the replenishment material, is mitigated. In this respect, in some embodiments, for example, where the replenishment material does not contain carrier agent, due to a concentration gradient, carrier agent, that is associated within the membrane 30, may transport from the membrane 30 to the replenishment material that is being contacted with the membrane 30.

In response to the contacting of the membrane 30 with the replenishment material, at least a fraction of the liquid material, of the replenishment material, becomes disposed within the liquid phase of the membrane 30.

In some embodiments, for example, the membrane 30 (130) is contacted with the replenishment material after at least some of the liquid material, of the liquid phase, has been depleted during the supplying of the gaseous feed material to the feed material receiving space 10 (110) (wherein the supplying is such that transferring (permeation) of the at least a separation fraction is effected). In this respect, in some embodiments, for example, the contacting with the replenishment material is effected after the supplying of the gaseous feed material to the feed material receiving space 10 (110) has been being effected.

In some embodiments, for example, the effecting of the contacting of the membrane with a replenishment material is effected in response to sensing that at least a fraction of the liquid material, which is disposed within the liquid phase of the membrane, becomes depleted.

With respect to the system 5 illustrated in FIG. 3, in some embodiments, for example, the replenishment material is supplied to the first apparatus 40 (such as, for example, the feed material receiving space 10 of the first apparatus 40) with effect that the replenishment material becomes disposed relative to the membrane 30 such that at least a fraction of the liquid material, of the replenishment material, becomes disposed within the liquid phase of the membrane 30, and such that a residual material, including replenishment material that has not become disposed within the liquid phase of the membrane 30, is discharged from the first apparatus 40 (such as, for example, the feed material receiving space 10 of the first apparatus 40). The discharged residual material is then supplied to the second apparatus 140 (such as, for example, the feed material receiving space 110 of the second apparatus 140) with effect that the replenishment material becomes disposed relative to the membrane 130 such that at least a fraction of the liquid material, of the replenishment material, becomes disposed within the liquid phase of the membrane 130.

For effecting the supplying of the residual material (that includes the replenishment material) from the first apparatus 40 to the second apparatus 140, the first apparatus 40 (such as, for example, the feed material receiving space 10) is fluidly coupled to the second apparatus 140 (such as, for example, the feed material receiving space 110) via a redistributor 200. The redistributor collects the discharged residual material and redistributes the collected discharged residual material for supplying to the second apparatus such that the residual material, including the replenishment material, becomes disposed relative to the membrane 130 such that at least a fraction of the liquid material, of the replenishment material, becomes disposed within the liquid phase of the membrane 130.

In some embodiments, for example, the redistributor includes a collector for collecting the discharged residual material from the first apparatus 40 (such as, for example, the feed material receiving space 10), and also includes a plurality of outlet ports (such as, for example, at least three (3) outlet ports, such as, for example, at least five (5) outlet ports, such as, for example, at least ten (10) outlet ports) for effecting supplying of the discharged residual material, that is collected by the collector, to the second apparatus 140 (such as, for example, the feed material receiving space 110). In some embodiments, for example, during operation, while the residual material is being discharged from the first apparatus (such as, for example, the feed material receiving space 10), received and collected by the collector of the distributor 200, and supplied to the second apparatus 140 (such as, for example, the feed material receiving space 110) via the outlet ports of the distributor, the liquid level of the liquid that is being collected by the collector is at least 0.5 inches, such as, for example, at least one (1) inch.

In some embodiments, for example, the effecting of the contacting of the membrane with a replenishment material is effected while the supplying of the gaseous feed material to the feed material receiving spaces 10, 110 of the system 5 is being effected. In this respect, in some embodiments, for example, the replenishment is effected while the separation process is being effected. In some embodiments, for example, while the separation process is being effected by the supplying of the gaseous feed material to the feed material receiving spaces 10, 110, the supplying of the replenishment material is effected to the permeate receiving spaces 20, 120.

In some embodiments, for example, the supplying of the replenishment material is effected to the feed material receiving space 10 of the first apparatus 40 while the gaseous feed material is being supplied to the feed material receiving space 10, such that a combined mixture of the gaseous feed material and replenishment material is supplied to the feed material receiving space 10. While the combined mixture is being supplied, the combined mixture becomes disposed relative to the membrane 30 such that: (i) permeation of at least a fraction of the operative material of the gaseous feed material, through the membrane 30, is effected, and (ii) at least a fraction of the replenishment material-disposed liquid material, of the replenishment material, becomes disposed within the liquid phase of the membrane 30, and a residual material is discharged from the feed material receiving space 10. The residual material includes gaseous feed material-disposed operative material that has not been separated from the gaseous feed material by virtue of the permeation process, and also includes replenishment material that has not become disposed within the liquid phase of the membrane 30. The residual material is received by the distributor 200, collected by the collector of the distributor, and then redistributed via the outlet ports of the distributor 200 for supply to the feed material receiving space 110 of the second apparatus, so as to effect recovery of additional gaseous feed material-disposed operative material via permeation through the membrane 130, and also effect replenishment of liquid within the liquid phase of the membrane 130.

In some embodiments, for example, the supplying of the replenishment material (to either one or both of the gaseous feed material receiving compartment 12 and the permeate receiving compartment 22) is effected by flowing the replenishment material in an upwardly direction. This effects improved contacting between the supplied replenishment material and the membrane 30.

In the above description, for purposes of explanation, numerous details are set forth in order to provide a thorough understanding of the present disclosure. However, it will be apparent to one skilled in the art that these specific details are not required in order to practice the present disclosure. Although certain dimensions and materials are described for implementing the disclosed example embodiments, other suitable dimensions and/or materials may be used within the scope of this disclosure. All such modifications and variations, including all suitable current and future changes in technology, are believed to be within the sphere and scope of the present disclosure. All references mentioned are hereby incorporated by reference in their entirety.

The invention claimed is:

1. A process for effecting separation of an operative material from a gaseous feed material, comprising:
   over a first time interval, within a first apparatus, separating a first fraction of the operative material in response to permeation of the first fraction of the operative material through a first membrane that includes a polymeric phase and a liquid phase, with effect that residual materials, including unseparated operative material is discharged and, within a second apparatus, from the residual materials, separating a second fraction of the operative material in response to permeation of the second fraction of the operative material through a second membrane that includes a polymeric phase and a liquid phase; and
   after the first time interval, disposing a liquid material relative to the first membrane of the first apparatus, such that a first fraction of the liquid material replenishes the liquid phase of the first membrane of the first apparatus, and residual liquid material is collected by a redistributor and redistributed such that the residual liquid material becomes disposed relative the second membrane of the second apparatus, such that a second fraction of the liquid material replenishes the liquid phase of the second membrane of the second apparatus.

2. The process as claimed in claim 1;
   wherein, during the first time interval:
   a fraction of the liquid material, of the liquid phase of the first membrane, becomes depleted; and
   a fraction of the liquid material, of the liquid phase of the second membrane, becomes depleted.

3. The process as claimed in claim 1;
   wherein each one of the first and second membranes, independently, includes a polysaccharide.

4. The process as claimed in claim 1;
   wherein each one of the first and second membranes, independently, includes chitosan.

5. The process as claimed in claim 1;
wherein for each one of the first and second membranes, independently, the liquid material includes water.

6. The process as claimed in claim 1;
wherein:
within the first apparatus, the permeation of the first fraction of the operative material through the first membrane is effected while at least one slower-permeating compound, of the gaseous feed material, is permeating through the first membrane; and
within the second apparatus, the permeation of the second fraction of the operative material through the second membrane is effected while at least one slower-permeating compound, of the gaseous material, is permeating through the second membrane.

7. The process as claimed in claim 1;
wherein:
within the first apparatus, the permeation of the first fraction of the operative material through the first membrane is effected while at least one slower-permeating compound, of the gaseous feed material, is permeating through the first membrane, with effect that the gaseous feed material is fractionated;
within the second apparatus, the permeation of the second fraction of the operative material through the second membrane is effected while at least one slower-permeating compound, of the gaseous material, is permeating through the second membrane, with effect that the residual material is fractionated.

8. The process as claimed in claim 6;
wherein:
for the permeation though the first membrane within the first apparatus:
the first fraction includes at least one operative compound;
for each one of the at least one operative compound of the first fraction, there is provided an operative compound-associated operative ratio defined by the ratio of the molar rate of permeation of the operative compound to the mole fraction of the operative compound within the feed material receiving space, such that a plurality of operative compound-associated operative ratios are defined, and at least one of the plurality of operative compound-associated operative ratios is a minimum operative compound-associated operative ratio; and
for each one of the at least one permeating slower permeating compound, the ratio of the molar rate of permeation of the slower permeating compound to the mole fraction of the slower permeating compound within the feed material receiving space is less than the minimum operative compound-associated operative ratio, such that, for each one of the at least one operative compound, the molar concentration of the operative compound within a gaseous permeate, that is permeated from the gaseous feed receiving space, through the first membrane, and into the permeate receiving space, is greater than the molar concentration of the operative compound within the gaseous feed material;
and
for the permeation though the second membrane within the second apparatus:
the second fraction includes the at least one operative compound;
for each one of the at least one operative compound of the second fraction, there is provided an operative compound-associated operative ratio defined by the ratio of the molar rate of permeation of the operative compound to the mole fraction of the operative compound within the feed material receiving space, such that a plurality of operative compound-associated operative ratios are defined, and at least one of the plurality of operative compound-associated operative ratios is a minimum operative compound-associated operative ratio; and
for each one of the at least one permeating slower permeating compound, the ratio of the molar rate of permeation of the slower permeating compound to the mole fraction of the slower permeating compound within the feed material receiving space is less than the minimum operative compound-associated operative ratio, such that, for each one of the at least one operative compound, the molar concentration of the operative compound within a gaseous permeate, that is permeated from the gaseous feed receiving space, through the second membrane, and into the permeate receiving space, is greater than the molar concentration of the operative compound within the gaseous feed material.

9. The process as claimed in claim 8;
wherein:
each one of the at least one operative compound, independently, is an olefin; and
each one of the at least one slower permeating compound, independently, is a paraffin.

10. The process as claimed in claim 1;
wherein:
the redistributor includes a collector for collecting the discharged residual materials from the first apparatus, and also includes a plurality of outlet ports for effecting supplying of the discharged residual materials, that is collected by the collector, to the second apparatus.

11. The process as claimed in claim 10;
wherein:
while the residual liquid material is being collected by and redistributed by the redistributor, the liquid level of the liquid that is being collected by the collector is at least 0.5 inches.

12. A process for effecting fractionation of gaseous feed material via a membrane that includes a polymeric phase and a liquid phase, comprising:
over a first time interval, within a first apparatus, fractionating the gaseous feed material via a first membrane that includes a polymeric phase and a liquid phase, with effect that retentate is discharged and, within a second apparatus, receiving the discharged retentate and fractionating the retentate via a second membrane that includes a polymeric phase and a liquid phase; and
after the first time interval, and over a second time interval, disposing a liquid material relative to the membrane of the first apparatus, such that a first fraction of the liquid material replenishes the liquid phase of the first membrane of the first apparatus, and residual liquid materials are collected by a redistributor and redistributed such that the residual liquid materials becomes disposed relative the second membrane of the second apparatus, such that a second fraction of the liquid material replenishes the liquid phase of the second membrane of the second apparatus.

13. The process as claimed in claim 12;
wherein, during the first time interval:
- a fraction of the liquid material, of the liquid phase of the first membrane, becomes depleted; and
- a fraction of the liquid material, of the liquid phase of the second membrane, becomes depleted.

14. The process as claimed in claim 12;
wherein each one of the first and second membranes, independently, includes a polysaccharide.

15. The process as claimed in claim 12;
wherein each one of the first and second membranes, independently, includes chitosan.

16. The process as claimed in claim 12;
wherein for each one of the first and second membranes, independently, the liquid material includes water.

17. The process as claimed in claim 12;
wherein, during the second time interval:
- within the first apparatus, the fractionating is effected while the replenishing is effected; and
- within the second apparatus, the fractionating is effected while the replenishing is effected.

18. The process as claimed in claim 12;
wherein:
- the gaseous feed material includes olefinic material, that is defined by at least one olefin, and paraffinic material, that is defined by at least one paraffin;
- the fractionating within the first apparatus is with effect that the retentate is enriched in the paraffinic material relative to the gaseous feed material; and
- the fractionating within the second apparatus is with effect that a second retentate and a second permeate are obtained, with effect that the second retentate is enriched in the paraffinic material relative to the retentate received by the first apparatus.

19. The process as claimed in claim 12;
wherein:
- the redistributor includes a collector for collecting the discharged residual materials from the first apparatus, and also includes a plurality of outlet ports for effecting supplying of the discharged residual materials, that is collected by the collector, to the second apparatus.

20. The process as claimed in claim 19;
wherein:
- while the residual liquid materials are being collected by and redistributed by the redistributor, the liquid level of the liquid that is being collected by the collector is at least 0.5 inches.

* * * * *